(12) United States Patent  (10) Patent No.: US 8,135,222 B2
Bressan  (45) Date of Patent: Mar. 13, 2012

(54) GENERATION OF VIDEO CONTENT FROM IMAGE SETS

(75) Inventor: Marco Bressan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 90 days.

(21) Appl. No.: 12/544,566

(22) Filed: Aug. 20, 2009

(65) Prior Publication Data

US 2011/0044549 A1 Feb. 24, 2011

(51) Int. Cl.
*G06K 9/62* (2006.01)
(52) U.S. Cl. .................. 382/225; 386/278; 348/239
(58) Field of Classification Search .............. 382/10, 382/224, 225, 226, 227, 278, 294, 305; 386/278, 386/281, 283; 348/239, 423.1
See application file for complete search history.

(56) References Cited

U.S. PATENT DOCUMENTS

| | | | |
|---|---|---|---|
| 5,729,471 A * | 3/1998 | Jain et al. ............... | 725/131 |
| 6,396,963 B2 | 5/2002 | Shaffer et al. | |
| 6,411,724 B1 * | 6/2002 | Vaithilingam et al. ........ | 382/100 |
| 6,789,088 B1 | 9/2004 | Lee et al. | |
| 7,130,864 B2 | 10/2006 | Lin et al. | |
| 7,450,785 B2 | 11/2008 | Haas et al. | |
| 7,451,160 B2 | 11/2008 | Kaneko et al. | |
| 7,594,177 B2 * | 9/2009 | Jojic et al. ............... | 715/720 |
| 2001/0021267 A1 * | 9/2001 | Jun et al. ............... | 382/165 |
| 2004/0233274 A1 | 11/2004 | Uyttendaele et al. | |
| 2005/0180730 A1 * | 8/2005 | Huh et al. .............. | 386/52 |
| 2006/0039674 A1 * | 2/2006 | Sonoda et al. ............ | 386/52 |
| 2006/0259863 A1 | 11/2006 | Obrador et al. | |
| 2007/0236513 A1 | 10/2007 | Hedenstroem et al. | |
| 2007/0239787 A1 | 10/2007 | Cunningham et al. | |
| 2007/0270985 A1 | 11/2007 | Shellshear | |
| 2008/0019661 A1 | 1/2008 | Obrador et al. | |
| 2008/0155422 A1 | 6/2008 | Manico et al. | |

FOREIGN PATENT DOCUMENTS

EP 2 116 970 A1 11/2009
WO 2006/050284 A1 5/2006

OTHER PUBLICATIONS

Applegate et al., "Concorde TSP Solver," at http://www.tsp.gatech.edu/concorde/, 2006.
Sivic et al., "Creating and Exploring a Large Photorealistic Virtual Space," in IEEE Workshop on Internet Vision, at CVPR '08, 2008.
Aylett, "Stochastic suprasegmentals: Relationships Between Redundancy, Prosodic Structure and Care of Articulation in Spontaneous Speech," In Proc. ICPhS99, 1999.
Genzel et al., "Entropy Rate Constancy in Text," In Proceedings of the 40th Annual Meeting of the Association for Computational Linguistics (ACL), Philadelphia, pp. 199-206. Jul. 2002.
Perronnin et al., "Fisher Kernels on Visual Vocabularies for Image Categorization," In CVPR07, 2007.
Jang, Chuljin., "A Smart Clustering Management for Concurrent Digital Photos using EXIF Metadata", Graphics Application Lab. Pusan Natiaonal University. PAP-08-003-GRA, Jan. 2008, pp. 1-13.
Extended European Search Report for Appl. No. EP 10173169 dated Feb. 18, 2011.

\* cited by examiner

*Primary Examiner* — Anand Bhatnagar
(74) *Attorney, Agent, or Firm* — Fay Sharpe LLP (57) ABSTRACT

An image processing method comprises: clustering images of a set of images to generate a plurality of scenes each comprising an unordered cluster of images; ordering images within scenes respective to video coherence to generate ordered scenes comprising ordered sequences of images; and generating video content as images ordered in accordance with the ordered sequences of images comprising the scenes. In some embodiments, the video content is converted to video comprising video frames played at a predetermined frame rate.

19 Claims, 3 Drawing Sheets

GENERATION OF VIDEO CONTENT FROM IMAGE SETS

BACKGROUND

The following relates to the information processing arts, information retrieval arts, image arts, video arts, communication arts, and related arts.

The acquisition and distribution of digital images is ubiquitous, due to a combination of technologies including affordable optical scanners and digital cameras for generating digital images, ongoing development of mass storage media with storage capacities sufficient for storing large image databases, and fast digital data network and Internet connections facilitating image distribution.

Development of technologies for efficiently viewing and selecting images has, however, lagged behind the image generation, storage, and distribution technologies. In a typical approach, a search engine receiving an image query retrieves a set of images (possibly reduced in size to promote efficiency, for example as "thumbnail" images) and displays the retrieved images in a mosaic or grid arrangement. The number of images in the mosaic is an accommodation of diverse factors such as the size and number of the displayed images, display technology limitations, constraints of the human visual system, and so forth, but is typically around twenty images per mosaic. This arrangement does not allow a user to efficiently review or select from a large number of images, such as several thousand images.

Additionally, existing mosaic displays generally do not relate the images to one another. In a mosaic, images are typically sorted by individual criteria that can be found in the metadata such as timestamp, photographer, image size, image name, image type, etc. When the mosaic display is used to present query results images are generally sorted by a criterion indicating individual relevance to the query. In both cases, an image on the first mosaic of (for example) twenty images may be nearly identical with an image in a later mosaic, perhaps separated by hundreds of intervening images. This does not facilitate selecting the "best" image from amongst a number of similar images.

The metadata information can also be used to augment mosaic display techniques by grouping the images. This approach is generally manual or semi-manual, requiring the user to indicate which metadata is relevant for the task at hand. Further, if the objective is to aggregate images generated by different devices (such as different digital cameras) or different users, then an additional problem may be that the timestamps generated by the different devices are not synchronized with each other.

As an example, consider a birthday party for a child, in which several of the attending parents bring digital cameras and take photographs throughout the birthday party. It is then desired to show these photographs acquired using the different digital cameras as an aesthetically pleasing presentation. One way to do so is to sort the images by timestamp. However, the result may be aesthetically unpleasing, because different images acquired by different cameras at about the same time may be taken from the very different viewpoints of the different cameras. The result is incoherent "jumping" of the viewpoint from one image to the next. Additionally, if one camera has its digital clock offset by, for example, ten minutes compared with other digital cameras at the party, then the photographs acquired by the temporally offset camera will be out of synch. Thus, for example, the presentation may show the child blowing out candles on a birthday cake, then move on to the birthday meal, and but with photographs of the child blowing out the candles acquired by the temporally offset camera being interspersed amongst photographs of the meal.

The above example is also illustrative of difficulties in selecting a photograph. For example, a reviewer may find an image of the child blowing out the candles that was taken from a certain viewpoint at a certain moment in time to be particularly appealing. The reviewer may want to know if there are any other, even better, images of this moment. Unfortunately, due to the incoherence of the presentation sorted by timestamp, images acquired are likely to be interspersed amongst numerous other images acquired from other viewpoints at about the same time, making it difficult for the reviewer to compare photographs similar to the one that appealed to the reviewer. Even if the images are further sorted by camera identification (assuming this metadata is available) the reviewer may still miss a similar image taken by different camera having a viewpoint similar to that of the camera that took the appealing photograph.

In addition to limitations on image selection, existing image distribution paradigms have some related deficiencies. For example, online photo sharing sites typically use a mosaic or slideshow approach for presenting photographs. The mosaic approach has already been discussed, and its deficiencies are also present in the photo sharing context.

The slideshow approach automatically displays images sequentially, usually with a preselected time interval between images. The slideshow approach can increase the speed at which a user can review photographs, but at the cost of reduced viewing time for each image. If the slideshow is made too fast, it can produce a "jumpy" sequence that is disconcerting to the viewer. If it is made too slow, then the total viewing time for the slideshow can be too long. Construction of a slideshow can also be time-consuming for the creator, since he or she generally must manually select the order of images in the slideshow sequence. Alternatively, if an automatic order selection is employed (for example, based on timestamp) this can increase the "jumpiness" of the resultant slideshow presentation.

These approaches also fail to provide a useful way to combine images by different photographers of the same event, and fail to provide a useful image retrieval approach other than based on metadata such as photographer or camera identity, timestamp, or so forth. Such device-generated metadata may have a tenuous relationship with the actual imaged subject matter, that is, with the photographed event or person or so forth.

BRIEF DESCRIPTION

In some illustrative embodiments disclosed as illustrative examples herein, an image processing method comprises: clustering images of a set of images to generate a plurality of scenes each comprising an unordered cluster of images; ordering images within scenes respective to video coherence to generate ordered scenes comprising ordered sequences of images; and generating video content as images ordered in accordance with the ordered sequences of images comprising the scenes.

In some illustrative embodiments disclosed as illustrative examples herein, a storage medium stores instructions executable to perform an image processing method comprising clustering images of a set of images to generate a plurality of scenes and ordering images within each scene respective to a video coherence criterion.

In some illustrative embodiments disclosed as illustrative examples herein, an image processing method comprises: automatically ordering a set of images based on a video coherence criterion; and playing the images as video comprising frames defined by the ordered set of images and played at a predetermined frame rate.

DETAILED DESCRIPTION

In the following, methods and apparatuses are disclosed which provide for viewing and optionally selecting, an image using an interface in which a set of images are presented as video content. As used herein, the term "video content" refers to a set of images ordered with respect to the basics of effective video discourse. These basics include division of content into one or more "scenes", where each scene is a sub-set of visually coherent images. Sets of images that are similar to each other are an example of visual coherence so scenes can be found by grouping similar images. The similarity can be given by any selected similarity measure, and the similarity measure may optionally incorporate metadata associated with the images.

The basics of effective video discourse further include a coherent ordering of images within each scene. This reflects the expectation that video content should flow smoothly within a scene. For example, a person is expected to move smoothly from one place to another during a scene, and is not expected to appear to suddenly "teleport" from one place to another during a scene.

On the other hand, coherence between scenes is generally not a basic of effective video discourse. For example, it is not uncommon for one scene to end with a person standing at a certain point, for example indoors, and for the next scene to start with the person standing someplace completely different, for example outdoors. Although coherence between scenes is not generally a basic of effective video discourse, some relationship between scenes may optionally be incorporated. For example, in some embodiments the presentation of the scenes may be ordered based on an average timestamp of the images in each scene. Other criterion for ordering the scenes is also contemplated.

It is recognized herein that presenting a set of images as video content ordered with respect to the basics of effective video discourse has certain advantages. By enforcing coherence within a scene, it is assured that the presentation is smooth and aesthetically pleasing. Visual coherence also increases the amount of images a user can navigate in a fixed amount of time with respect to a random ordering. This is because when information is processed online (in analogy to reading a paragraph), the time it takes to process each new bit of information, e.g. a word, is related to the predictability of this word from the current context. Moreover, for image selection purposes, a coherent presentation of images within a scene biases toward grouping together images that are similar to one another based on the similarity criterion used in determining coherence. As a result, the user can naturally identify a group of images that are similar in a coarse sense (for example, all being of a scene in which a child blows out candles) and then can review the individual images of the scene, for example by using frame-by-frame stepwise viewing mode that is available in many video player engines, so as to compare in more detail the similar images that are grouped together by the scene coherence in order to select the best image from among the similar images of the scene.

On the other hand, it is recognized herein that attempting to impose coherence globally over the set of images may be impractical or undesirable. For example, in the example of birthday party photographs used herein, if the party moves from the dining room (during the meal) to the great room (for the childrens' games) it may be undesirable to attempt to impose coherence between photographs taken in the dining room and photographs taken in the great room. Such differences may be even greater in other applications, such as presenting photographs taken over a weeklong vacation trip through Europe, in which photographs may have been taken in different countries, in different cathedrals or other buildings, and so forth. It is recognized herein that such strong differences between groups of images can be readily accommodated by adapting the concept of scenes from the video arts to the image presentation arts.

Another advantage of the disclosed approach of presenting a set of images as video content ordered with respect to the basics of effective video discourse is the ability to store the images presentation using a standard video codec such as MPEG, DivX, Xvid, FFmpeg, avi, wmv, or so forth, and to present the images presentation as video using a general-purpose video or multimedia player engine such as MPlayer (available at http://www.mplayerhq.hu/), VLC media player (available at http://www.videolan.org/vlc/), Windows Media Player™ (available from Microsoft Corporation, Redmond, Wash., USA), Quicktime (available from Apple Corporation, Cupertino, Calif., USA), or so forth. This enables rapid presentation of the images (up to the frame rate of the video, which is typically of order 24-30 frames per second) and access to useful built-in features such as frame-by-frame viewing mode for selecting individual images. As used herein, it is to be understood that video comprises frames that are played at a predetermined frame rate.

It is also to be understood that while video content refers to a set of images ordered with respect to the basics of effective video discourse, the video content does not need to be stored in a conventional video storage format, and is not necessarily presented as video using a video or multimedia player engine. For example, it is contemplated for the video content comprising a set of images ordered with respect to the basics of effective video discourse to be stored as presentation slides stored in a conventional presentation format such as ODP or PPT, and capable of being presented using a general-purpose slide presentation application such as OpenOffice.org Impress (available from http://openoffice.org/) or Microsoft PowerPoint (available from Microsoft Corporation, Redmond, Wash., USA). It is also contemplated to store the video content using a non-standard format, and to present the video content using specialized software.

Furthermore, it is to be understood that the term "video content" does not require that the set of images ordered with respect to the basics of effective video discourse be presented as video at a video frame rate. Indeed, even if the images are stored in a conventional video format and presented as video using a general-purpose video or multimedia player engine, the images can be duplicated such that the presentation rate is much slower than the video frame rate. For example, if the video is played at a video frame rate of thirty frames per second and it is desired for the images to be presented at a rate of one image per second, then each image can suitably define thirty successive frames so that when the video is played at thirty frames per second the image is displayed for one second.

Figure 1:
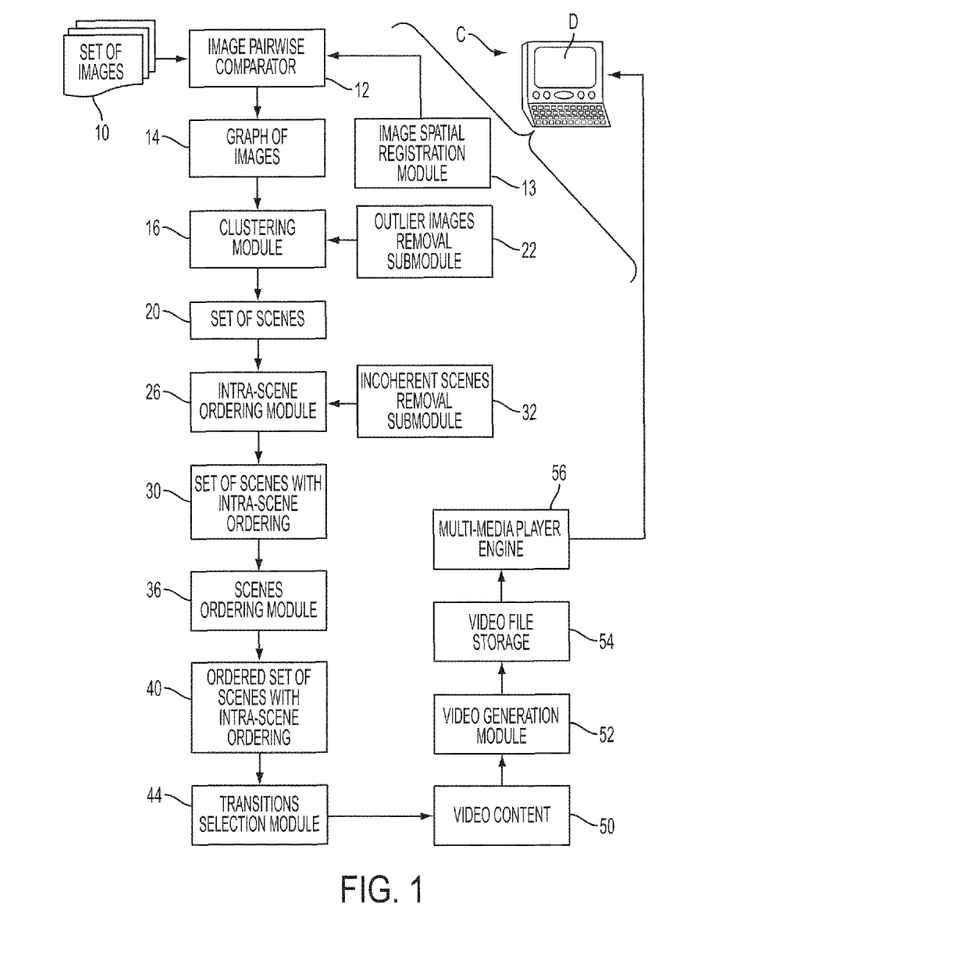
FIG. 1 diagrammatically shows an illustrative system for generating video from image sets.

With reference to FIG. 1, an illustrative system is described for converting a set of images 10 into video content comprising a set of images ordered with respect to the basics of effective video discourse. The set of images 10 is treated as an unordered set of images, although the images may have timestamp information or other metadata which could be used to define an ordering of the images.

The first processing operation in the conversion to video content is to divide the images into one or more scenes. To do so, the set of images 10 is clustered to identify images having similarity as measured by a suitable comparison measure, such as a similarity measure (for which larger values indicate greater similarity) or a distance or divergence measure (for which smaller values indicate greater similarity). In the illustrated embodiment, the clustering is based on pairwise comparisons between images computed using an image pairwise comparator 12. The comparison measure can utilize information derived from the image itself, or can use metadata associated with the image, or can use a combination of image-derived information and associated metadata information. For example, in one approach each image is represented by a feature vector based on local features, and the comparison employs a Fisher kernel. See Perronnin et al., "Fisher kernel on visual vocabularies for image categorization", in Conference on Computer Vision and Pattern Recognition 2007 (CVPR07). To perform comparison over the entire image, in some embodiments the image is split into a fixed number of regions and a region-by-corresponding region comparison is performed, with the final similarity measure being a sum, average, or other aggregation of the per-region comparison measures.

The selected comparison measure optionally incorporates metadata, such as an identification of the imaging device, or an identification of the subject of the image, or other metadata as may be available. Another contemplated comparison measure focuses on faces. Using known techniques for identifying faces in an image, the similarities between portions of the image depicting faces can be compared by a suitable comparison measure. For example, the comparison measure is contemplated to be a facial recognition measure, so that the subsequent clustering is based on information pertaining to individual persons appearing in the images.

The output of the comparator 12 can take various forms or descriptions. The output can be viewed as a graph of images 14 in which the nodes of the graph are the images of the set of images 10 and the nodes are connected by edges having weights corresponding to a function of the pairwise comparison measures. The output of the comparator 12 can alternatively be viewed as a pairwise similarity matrix whose elements $d_{ij}$ are the comparison measures comparing the i-th and j-th images. (Note that the term "similarity" matrix is conventionally used; however, it will be understood that the comparisons can employ similarity measures or, alternatively, distance or divergence measures). For example, given images $I_i, I_j \in \{I_n\}_{n=1\ldots N}$ where $\{I_n\}_{n=1,\ldots,N}$ is the set of images 10, the comparison measure between the images can be written as $d_{ij}=f(I_i,I_j)$. From the graph viewpoint, the element $d_{ij}$ is the weight of the edge connecting the image nodes $I_i$, $I_j \in \{I_n\}_{n=1,\ldots,N}$. In general, the similarity matrix may be either symmetric (that is, $d_{ij}=d_{ji}$ always holds) or asymmetric (that is, $d_{ij} \neq d_{ji}$ is possible). If the comparison measure f is asymmetric, then a symmetric similarity matrix can be constructed using a suitable symmetrization, such as $d_{ij}=f(I_i,I_j)+f(I_j,I_i)$.

The clustering is suitably performed by a clustering module 16 based on the comparison measures 14, and can employ any suitable clustering algorithm, such as spectral clustering, kernel-based clustering, probabilistic latent semantic analysis (PLSA), or so forth. Spectral clustering techniques, for example, make use of the spectrum of the similarity matrix of the data to perform dimensionality reduction for clustering in fewer dimensions. In some formulations of the spectral clustering approach, a symmetric similarity matrix is decomposed using eigenvalue decomposition to generate a product of matrices $A \cdot D \cdot A^T$ where D is a diagonal matrix whose diagonal elements are eigenvalues of the symmetric similarity matrix, A is another matrix, and the superscript "T" denotes a transpose operation. In the spectral clustering paradigm, the columns of the matrix A are interpreted to associate images with clusters.

The clustering can employ hard partitioning, for example using a max operator, in which each image is assigned exclusively to a single cluster. Alternatively, the clustering can employ soft partitioning, for example by applying a threshold on the probabilities, in which each image may in general be assigned to one or more clusters.

Although clustering techniques based on pairwise comparison measures are set forth herein as illustrative examples, other clustering techniques can be employed, including clustering techniques that operate directly on feature vectors or other representations of the images, rather than operating on pairwise similarities between images, such as the K-Means approach.

The output of the clustering module 16 is a plurality of scenes 20. Each scene as output by the clustering module 16 comprises an unordered cluster of images generated by the clustering. If the clustering employs hard partitioning, then each image is assigned to a single cluster. On the other hand, if the clustering employs soft partitioning, then it is possible for a given image to be assigned to two or more clusters. On average, soft partitioning can result in more images in a cluster (an image assigned to two clusters can be viewed as being "duplicated") as compared with hard partitioning. Including more images in a cluster can enhance the likelihood that a smooth transition will be found between images, and hence promotes the achievability of video coherence within the cluster. On the other hand, for some applications such as image selection it may be undesirable to have images repeated between different scenes—for such applications, hard partitioning is preferably used.

Optionally, the clustering module 16 can incorporate an outlier images removal sub-module 22 that removes images that do not fit well within any of the clusters that are generated by the clustering. Such outlier filtering may be useful, for example, to enhance the coherence of the video content by removing images that are so different from other images that they would likely substantially degrade the video coherency. In query-based image retrieval applications, removal of outlier images can also have a beneficial filtering effect on the search results, since a retrieved image that is very different from the other retrieved images is more likely to be irrelevant. In some embodiments, the outlier images removal sub-module 22 may also remove entire clusters of images, for example if the number of images in a cluster is too small, or the average or other aggregate distance between images within a cluster is too large. In some embodiments, the selected cluster partitioning may inherently provide removal of outlier images, without operation of the illustrated optional dedicated outlier image removal submodule 22. For example, if a threshold-based soft partitioning is used, then an "outlier" image whose cluster membership probabilities output by the clustering do not meet the threshold criterion for any cluster are effectively removed.

In some actually constructed implementations, PLSA was used for the clustering, with soft partitioning employing a threshold of 0.4 on the posteriors. This was found to provide more homogeneous scenes at the cost of duplicating some images across scenes and potentially omitting some outlier images from the final sequence. The actually constructed implementations also eliminated scenes that were too small, namely scenes containing fewer than ten images in the actually constructed implementation. More generally, the threshold cluster size for eliminating small clusters is suitably selected based on the size of the set of images 10, the nature of the images in the set of images 10, the desired structure of the video discourse, or so forth. Alternatively, the clustering can be constrained to output clusters that are larger than a threshold size, so as to avoid undesirably small scenes (or undesirably short scenes, as viewed in the context of the video content presentation to be constructed). As already noted, other criteria such as an aggregate distance between images in a cluster can also be used as a criterion for selecting scenes for removal.

The objective of the clustering operation performed by the clustering module 16 is to group together images that are "similar" in that they are likely to be combinable to form a coherent sequence of images in which people, objects, or other features depicted in the images do not undergo abrupt changes in position, size, orientation, or other aspects from one image to the next. The clustering performed by the clustering module 16 groups images that are similar to each other into scenes 20, where the comparison metric is the comparison measure employed by the comparator 12. As a consequence, the images within a scene are expected to be similar to one another, and hence are likely to be arrangeable in an order that substantially respects video coherence.

Toward that end, an intra-scene ordering module 26 orders images within scenes respective to video coherence to generate a set of ordered scenes 30 comprising ordered sequences of images. Consider a scene having S<N images clustered from the set of N images 10. In other words, the scene can be viewed as an unordered subset of S images selected by the clustering from the set of N images 10. Define a particular ordering for the set of images as $I_1, I_2, \ldots, I_S$. For video coherence, it is desired that two successive images in the sequence should be as similar as possible. Therefore, in the aggregate, it is desired to maximize the value $$\sum_{i=1}^{S-1} d_{i,i+1}$$

where $d_{i,i+1}$ is a similarity measure, or to minimize the value $$\sum_{i=1}^{S-1} d_{i,i+1}$$

where $d_{i,i+1}$ is a difference or divergence measure.

Said another way, it is desired to estimate a shortest path through the images within a scene respective to pairwise comparisons between pairs of images. Such a shortest path estimation is sometimes referred to as the "traveling salesperson problem", and numerous methods are known for estimating the shortest path. Determining the global shortest path is, however, difficult or impossible for a large set of objects such as a typical scene generated by the clustering module 16. Accordingly, the phrase "shortest path estimation" and similar phraseology denotes an approximate or estimated solution to the shortest path problem, and does not necessarily denote the global solution, which is typically difficult or impossible to obtain, especially as the number of images in scene increases.

In some actually constructed implementations, the shortest path estimation is performed using the Lin-Kernighan traveling salesperson heuristic. See Applegate et al., "Concorde TSP Solver" (2006) (available at http://www.tsp.gatech.edu/concorde/). Optionally, additional heuristics can be used such as time information available, for example, from timestamp metadata associated with the images. The Lin-Kernighan traveling salesperson heuristic calls for a selection of the first node (first image, for the present application) in the path. In the actually constructed implementations, the first image in the path was chosen to be the image with the earliest timestamp value among the images comprising the scene. Other first image selection criteria are also contemplated, such as selecting the image closest to the centroid of the cluster defining the scene. In a semi-supervised setting, the user would choose this first image or select it based on candidate results. Moreover, the Lin-Kernighan traveling salesperson heuristic is merely an illustrative shortest path estimation example, and more generally substantially any exact or approximate shortest path estimation or determination technique can be used to implement the shortest path estimation.

Optionally, an incoherent scenes removal module 32 operates to remove scenes that do not have sufficient video coherence. For example, the optional incoherent scenes removal module 32 may remove any scene whose average or other aggregate distance between successive images within the scene, ordered in accordance with the estimated shortest distance, is larger than a threshold value. Alternatively, if the average or other aggregate distance between successive images within the scene, ordered in accordance with the estimated shortest distance, is larger than a threshold value then the intra-scene ordering module 26 may be re-applied to provide a (hopefully shorter) estimated shortest distance. It is also contemplated to re-apply the clustering module 16 or to re-define the pairwise image comparison measures by reapplying the image pairwise comparator 12 in the event that ordered scenes with undesirably high video coherence are output by the intra-scene ordering module 26. The number of clusters is one parameter that could have an impact in improving scene quality, e.g. merging scenes that, when considered individually, lack acceptable video coherence.

The set of scenes with intra-scene ordering 30, also referred to herein as a set of ordered scenes 30, provides substantial video coherence within each scene. In some embodiments, this may be the final video content output. For example, each ordered scene can be treated as a unit of video content, and can be presented using a presentation application or otherwise utilized. In other embodiments, including the illustrated embodiment, the ordered scenes 30 are further processed to select an ordering of the ordered scenes 30. In some embodiments, the number of scenes may be sufficiently small that a manual ordering of the ordered scenes 30 is contemplated. However, manual ordering of the scenes may be impractical for a large set of images for which the clustering generates a large number of scenes, and manual ordering may be undesirable even for a small number of scenes.

Accordingly, in the illustrated embodiment the ordering of the ordered scenes 30 is performed automatically by a scenes ordering module 36. If the ordering of the ordered scenes 30 is considered unimportant for the specific application, then the scenes ordering module 36 can apply any arbitrary, preferably computationally efficient, ordering scheme, such as ordering the scenes in accordance with an arbitrary indexing of the clusters used during the clustering. Alternatively, the scenes ordering module 36 may order the ordered scenes 30 by cluster size, so that the scenes of the video content are presented successively in order of decreasing (or, alternatively, increasing) size (or length, from the presentation viewpoint). This approach may be appropriate, for example, if the set of images 10 are a "top-N" images retrieved by a query-based image retrieval system. In such an application, the largest scene is likely to contain the most relevant images. As a more specific example, if the query is the text "cats" then the largest scene likely will contain images of feline animals which is most likely what was intended by the query "cats", while a substantially smaller scene may contain images relating to Andrew Lloyd Webber's broadway musical "Cats", and so forth.

In other embodiments, the scenes ordering module 36 may order the scenes based on an average or other aggregate datestamp of the images contained in the scene. This is the approach employed in some actually constructed implementations. This scenes ordering criterion is likely to be appropriate for constructing video content from images acquired for an event such as a birthday party or so forth, where the viewer is likely to want to see images of the event in something approximating chronological order. For such an application, the scenes are preferably ordered by increasing average timestamp. Instead of the average aggregation function, another aggregation function such as the minimum timestamp within a scene may be used.

The output of the scenes ordering module 36 is an ordered set of scenes with intra-scene ordering 40. In some embodiments, this may be the final video content output. In other embodiments, such as the illustrated embodiment, the ordered set of scenes with intra-scene ordering 40 is further optionally processed to select transitions between successive scenes, and is further optionally processed to select transitions between successive images within scenes, and is further optionally processed to determine a display time for each image. The transition selections can optionally be done manually.

Alternatively, as shown in the illustrated embodiment, a transitions selection module 44 automatically selects transitions between successive scenes and automatically selects transitions between images within scenes, and automatically selects a display time for each image. In some embodiment, these values are selected as uniform default values. For example, one approach is to have a fixed display time (for example, 0.2 second) for each image, and to have an abrupt transition between successive images within a scene, and to have a fixed transition such as a 0.5 second fade-to-black transition between successive scenes. More generally, the transitions include any suitable cinematic transition such as: abrupt (that is, a hard transition); fade-to-black; morph; or so forth.

In some actually constructed implementations, the inter-scene transitions, that is the transitions from the last image of one scene to the first image of the immediately succeeding scene, are set by default to a 0.5 second fade-to-black transition, while the transitions between successive images within a scene are abrupt (hard) transitions, and the display time for each image is selected to provide a constant entropy rate within the scene. The choice of image display times providing a constant entropy rate is based on evidence suggesting that efficient real communication follows an Information Theory principle stating that the most efficient way to send information trough noisy channels is at a constant rate. See Genzel et al., "Entropy Rate Constancy in Text", in Proceedings of the 40th Annual Meeting of the Association for Computational Linguistics (ACL), Philadelphia, July 2002, pp. 199-206. In the case of speech, maintaining a constant entropy rate over time entails pronouncing more carefully the less common verbiages. See Aylett, "Stochastic suprasegmentals: Relationships between redundancy, prosodic structure and care of articulation in spontaneous speech", in Proc. ICPhS99, 1999. In the context of a video this can be approximately translated to the principle that image transitions should be slower as the uncertainty on what information follows increases. If it is assumed that transitions between similar images are more probable than between dissimilar images, a transition rate providing a constant entropy rate is suitably defined that is proportional to the distance between successive images. Defining a mean distance md and standard deviation sd between all arbitrary images, and further defining m and M as the minimum and maximum image transition rates, respectively, the transition rates between two images $I_i$ and $I_{i+1}$ having a distance therebetween written as $d_{i,i+1}$ (where for this specific example d is a distance or divergence measure, rather than a similarity measure), then the transition rate between two successive images at the distance $d_{i,i+1}$ is suitably defined by the following logistic function $T(d_{i,i+1})$:

$$T(d_{i,i+1}) = \frac{M + m \cdot e^{\frac{-k(d_{i,i+1}-md)}{sd}}}{1 + e^{\frac{-k(d_{i,i+1}-md)}{sd}}}, \quad (1)$$

where the parameter k controls the rate of change. In the actually constructed implementations, the values M=0.5 sec and m=0.05 sec were chosen.

The output of the transitions selection module 44 is video content 50 that includes an ordered set of ordered scenes with defined transitions between scenes and between successive images within scenes as well as defined presentation times for the images. The video content 50 can optionally be stored without further processing in various ways. For example, in one approach, the set of N images 10 are stored with an identification index i where $1 \leq i \leq N$. The video content 50 can then be stored as: (1) an ordered path vector P= $[p_1, p_2, \ldots, p_L]$ where L is the number of images in the video content 50 (including any duplicate images in different scenes) and where vector element $p_l$ contains the identification index of the lth image to be presented during presentation of the video content 50; and (2) a transition vector T= $[t_1, t_2, \ldots, t_L]$ where vector element $t_l$ contains information including the presentation time for the lth image to be presented during presentation of the video content 50 and transition information for the transition from presenting the lth image to presenting the (l+1)th image.

The video content 50 can optionally be further processed and packaged in various ways. In some embodiments, for example, the video content 50 is packaged and stored as a slide presentation file in which each image is embodied as one slide. Existing general-purpose slide presentation application programs such as OpenOffice.org Impress or Microsoft PowerPoint have a built-in "slide show" presentation mode in which the transitions and image (i.e., slide) display times can be configured individually for each transition and each slide, respectively. The video content 50 packaged as such a slide presentation can be stored as in a conventional presentation format such as ODP or PPT, and can be presented using a general-purpose slide presentation application such as OpenOffice.org Impress or Microsoft PowerPoint.

In the illustrated embodiment, the video content 50 is packaged by a video generation module 52 as video comprising frames that are played at a predetermined frame rate. To accommodate the presentation time of each image to the frame rate of the video, an image can be duplicated an effective number of times. For example, if the display time for an image is $t_d$ and the video frame duration is $t_f$, where it is assumed that $t_d \geq t_f$, then the image can be represented by duplicating the image by a number of times equal to the nearest integer to $t_d/t_f$. As a more specific example, if $t_d$=0.5 sec and $t_f$=0.04 sec (corresponding to a frame rate 25 frames/sec) then $t_d/t_f$=12.5 and the image is suitably duplicated for either 12 or 13 frames (depending upon the rounding rule used). Depending upon the resolution of the images 10 and the resolution of the video, the video generation module 52 may downsample, upsample, or otherwise process the images to generate frames with the appropriate video resolution. Other image aspects, such as color palette or aspect ratio, may also be adjusted suitably to adapt the images to video.

Transitions are suitably implemented by the video generation module 52 as follows. An abrupt (hard) transition is implemented by going immediately to a frame showing the next succeeding image, while other transitions such as fade-to-black are suitably implemented using a succession of frames that are successively "blacker" or which simulate or effectuate the desired transition.

The video generation module 52 formats or codifies the video comprising the generated frames using a selected video codec such as MPEG, DivX, Xvid, FFmpeg, avi, wmv, or so forth. Such formatting or codification may include aspects such as image compression or so forth as defined by the codec. The video codified in accordance with the selected video codec is stored in a video file storage 54, which may for example include: a hard disk, optical disk, electrostatic memory, or other storage medium of a computer; a hard disk, optical disk, or other storage medium of a digital video recorder; or so forth.

The stored video is suitably presented by playing the video using a general-purpose video or multimedia player engine such as MPlayer, VLC media player, Windows Media Player™, Quicktime, or so forth, or by playing the video from a digital video recorder or the like. In order to play back properly, the selected general-purpose video or multimedia player engine should have a decoder installed that can "read" the codec in which the video was stored. In some embodiments, the storage operation may be omitted. For example, the video may be streamed over the Internet or over another digital network.

The processing components 12, 16, 22, 26, 32, 36, 44, 52, 56 are suitably embodied by one or more digital devices including digital processors suitably programmed to perform the relevant operations. In the illustrated embodiment, a computer C includes a digital processor and memory (components not shown) configured to embody these components, and also includes a display D on which the video content may be presented as video, or as a slide show presentation, or so forth. Instead of a computer, other digital processing devices can be used. As another illustrative example, the processing components 12, 16, 22, 26, 32, 36, 44, 52, 56 can be embodied by a digital camera that acquires the set of images 10, so that the digital camera can generate the video content 50, display it on the screen of the digital camera, generate and store the video on the camera's memory card, off-load the video to a computer or other device, or so forth. In other embodiments, the various processing components may be embodied by two or more different digital devices. For example, the video generation components 12, 16, 22, 26, 32, 36, 44, 52 may be embodied by a computer, while the multimedia player engine 56 may be embodied by a television operatively connected with a digital video recorder, DVD, or other device providing video playback capability.

In other embodiments, one or more storage media store instructions executable by a digital processing device so as to embody the processing components 12, 16, 22, 26, 32, 36, 44, 52, 56. The one or more storage media may include, for example: an optical disk or other optical storage medium; a hard disk drive or other magnetic storage medium; a flash memory or other electrostatic storage medium; a storage associated with an Internet server; or so forth.

Figure 2:
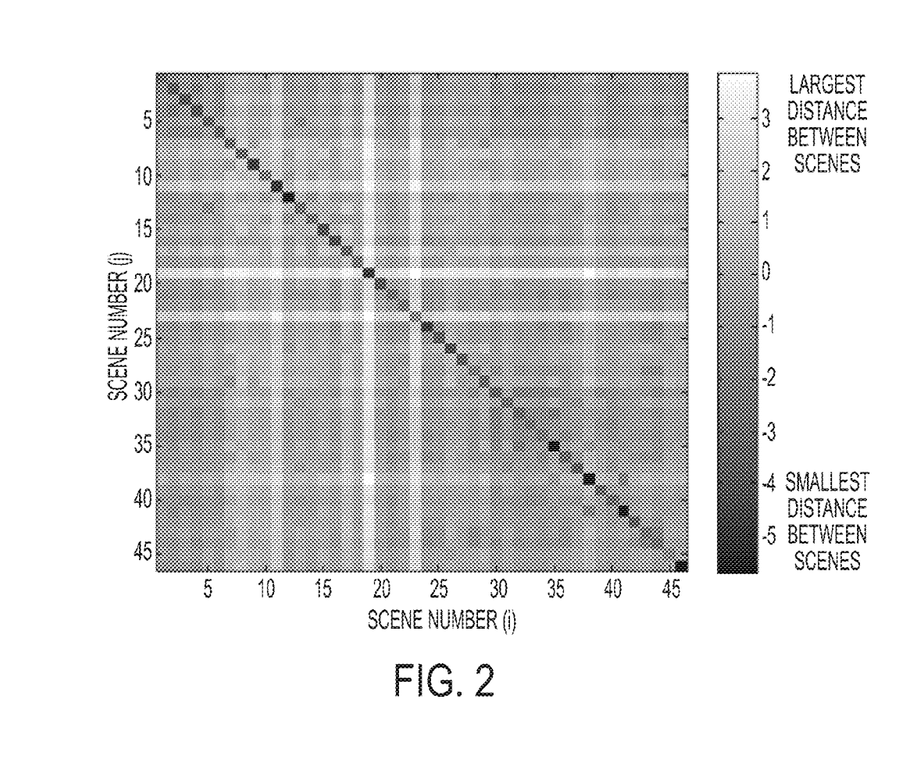
FIGS. 2 and 3 diagrammatically show selected quantitative metrics for video content generated using an actually constructed implementation of the system of FIG. 1.
Figure 3:
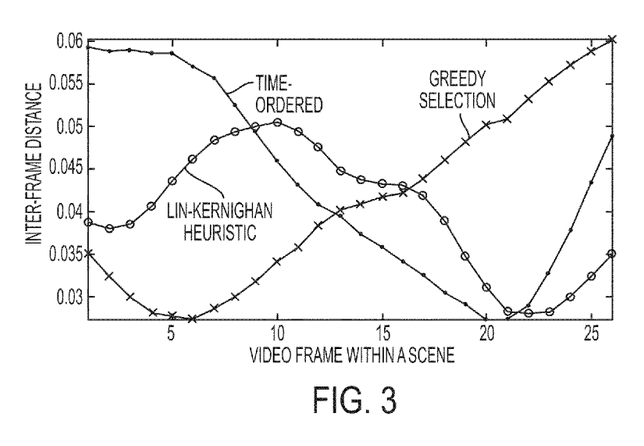

With reference to FIGS. 2 and 3, some metrics are shown for video content generated by actually constructed implementations of the system of FIG. 1 applied to images acquired by a digital camera during a walkthrough tour of a European monastery. FIG. 2 shows a two-dimensional grid whose axes correspond to scenes of the video content generated by the clustering module 16 employing a PLSA clustering algorithm with soft partitioning employing a threshold of 0.4 on the posteriors. The grayscale intensity at each grid element (i,j) indicates an aggregate of the distances between images in scene i and images in scene j. As expected, due to the clustering the grid elements for which i=j have the highest similarity, as indicated by the dark diagonal line seen in FIG. 2 running from the upper left to the lower right. FIG. 3 plots the distance $d_{i,i+1}$ (where for this specific example d is a distance or divergence measure, rather than a similarity measure) between successive images of a scene comprising twenty-six images, where the intra-scene ordering module 26 was configured to use three different shortest path estimation techniques: (1) a time ordering in which images are ordered in accordance with the image timestamp metadata (this approach assumes that images acquired by the digital camera successively in time are likely to be similar); (2) a greedy selection approach in which a first image is assumed, the second image that is most similar to the first image is selected next, the image most similar to the second image is selected next, and so forth until all images in the unordered scene are selected; and (3) the Lin-Kernighan traveling salesperson heuristic.

With continuing reference to FIG. 3, the time-ordered approach provides wildly diverging results, since in some cases the underlying assumption may be very good (for example, taking several pictures of the same person in succession) while in other cases the underlying assumption may be very poor (for example, a photograph of a person followed by a photograph of a stained glass window). The greedy approach provides very good results for the early image selections, because initially it is easy to find a similar image from amongst the large number of available images in the scene. However, as the greedy selection process goes on, the number of remaining available images decreases steadily, with the result that the distance $d_{i,i+1}$ between successive images becomes increasingly larger as the video content progresses further into the scene. The Lin-Kernighan traveling salesperson heuristic advantageously provides a good "average" distance $d_{i,i+1}$ between successive images over the entire scene, since it entails an optimization of the path over the entire scene.

FIG. 3 shows results for a relatively short scene comprising only twenty-six images. The achievable video coherence is generally expected to increase as the number of images in the scene increases for a given clustering algorithm. In this scenario, all images come from the same source. It is expected that the quality of the results increases as image set 10 is generated from multiple sources. There are tradeoffs between the clustering and scene length. For example, an aggressive partitioning criterion that only clusters very similar images generally outputs small clusters of very similar images providing short ordered scenes. These short ordered scenes may have high video coherence in spite of their shortness, due to the high degree of similarity of images within the scene. On the other hand, a less aggressive partitioning criterion that groups less similar images generally outputs a larger cluster of less similar images. The subsequent ordered scene may have less video coherence in spite of its greater length, due to the higher dissimilarity between the images within the scene. The dynamicity of a video sequence is related to the length of the scenes. Hence, the number of clusters parameter can be used to tune the desired dynamicity of the output video.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing method comprising:
   clustering images of a set of images to generate a plurality of scenes each comprising an unordered cluster of images wherein the clustering is based on pairwise comparisons between pairs of images of the set of images;
   ordering images within scenes respective to video coherence to generate ordered scenes comprising ordered sequences of images; and
   generating video content as images ordered in accordance with the ordered sequences of images comprising the scenes;
   wherein at least the clustering and the ordering are performed by a digital processor.

2. The image processing method as set forth in claim 1, further comprising:
   displaying or storing or streaming the video content.

3. The image processing method as set forth in claim 1, further comprising:
   generating feature vectors representative of the images of the set of images; and
   generating the pairwise comparisons as comparisons of feature vectors of pairs of images.

4. The image processing method as set forth in claim 3, wherein the generating of feature vectors incorporates metadata associated with the images of the set of images into the feature vectors.

5. The image processing method as set forth in claim 1, wherein the clustering employs soft partitioning.

6. The image processing method as set forth in claim 1, further comprising:
   assigning a scene date for each scene based on an aggregation of timestamps of images within the scene, the generating of video content comprising ordering scenes within the video content based on the scene dates.

7. The image processing method as set forth in claim 1, wherein the ordering of images within scenes respective to video coherence comprises:
   estimating a shortest path through the images within a scene respective to pairwise comparisons between pairs of images.

8. An image processing method comprising:
   clustering images of a set of images to generate a plurality of scenes each comprising an unordered cluster of images;
   ordering images within scenes respective to video coherence to generate ordered scenes comprising ordered sequences of images;
   generating video content as images ordered in accordance with the ordered sequences of images comprising the scenes;
   selecting a display time for each image; and
   generating video comprising video frames based on the video content wherein each image of the video content defines one or more video frames effective to cause the image to be displayed for the determined display time when the video is played at a predetermined frame rate;
   wherein at least the clustering and the ordering are performed by a digital processor.

9. The image processing method as set forth in claim 8, wherein the ordering of images within scenes respective to video coherence comprises:
   estimating a shortest path through the images within a scene respective to pairwise comparisons between pairs of images.

10. The image processing method as set forth in claim 9, wherein the estimating a shortest path through the images within a scene comprises:
    selecting a first image for the shortest path based on timestamps of the images.

11. The image processing method as set forth in claim 8, wherein the selecting a display time for each image comprises:
    selecting a display time for each image based on a constant entropy criterion for the generated video.

12. The image processing method as set forth in claim 8, further comprising
    playing the generated video at the predetermined frame rate.

13. A non-transitory storage medium storing instructions executable by a digital processor to perform an image processing method comprising clustering images of a set of images to generate a plurality of scenes and ordering images within each scene respective to a video coherence criterion, wherein the video coherence criterion comprises an estimation of a shortest path through the images within the scene wherein the estimation employs a pairwise image comparison measure.

14. The non-transitory storage medium as set forth in claim 13, further storing instructions executable to generate video content as images ordered in accordance with the ordered sequences of images comprising the scenes.

15. The non-transitory storage medium as set forth in claim 14, further storing instructions executable to generate video comprising frames defined by the video content.

16. The non-transitory storage medium as set forth in claim 14, further storing instructions executable to generate video comprising frames defined by the video content wherein display times for the images within each scene are selected to conform with a constant entropy criterion.

17. The non-transitory storage medium as set forth in claim 13, wherein the clustering is respective to pairwise image comparisons.

18. An image processing method comprising:
    automatically ordering a set of images based on a video coherence criterion comprising a shortest distance estimation wherein the automatic ordering comprises clustering the set of images to generate clusters defining a plurality of scenes and automatically ordering the images within each scene based on the video coherence criterion; and playing the images as video comprising frames defined by the ordered set of images and played at a predetermined frame rate.

19. An image processing method comprising:

automatically ordering a set of images based on a video coherence criterion;

playing the images as video comprising frames defined by the ordered set of images and played at a predetermined frame rate; and selecting the predetermined frame rate using a constant entropy criterion.

* * * * *